United States Patent
Leitao et al.

(10) Patent No.: US 11,086,517 B2
(45) Date of Patent: Aug. 10, 2021

(54) PAGE FRAME SECURITY

(71) Applicant: INTERNATIONAL BUSINESS MACHINES CORPORATION, Armonk, NY (US)

(72) Inventors: Breno H. Leitao, Araraquara (BR); Juscelino Candido De Lima Junior, Campinas (BR); Carlos Eduardo Seo, Sao Paulo (BR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 291 days.

(21) Appl. No.: 16/174,642

(22) Filed: Oct. 30, 2018

(65) Prior Publication Data

US 2020/0133490 A1    Apr. 30, 2020

(51) Int. Cl.
*G06F 3/06* (2006.01)

(52) U.S. Cl.
CPC ............ *G06F 3/0604* (2013.01); *G06F 3/064* (2013.01); *G06F 3/0673* (2013.01)

(58) Field of Classification Search
CPC ...... G06F 3/06–0689; G06F 2003/0691–0698; G06F 12/00–16
See application file for complete search history.

(56) References Cited

U.S. PATENT DOCUMENTS

| | | | |
|---|---|---|---|
| 5,619,671 A | 4/1997 | Bryant et al. | |
| 7,139,915 B2 | 11/2006 | Detreville | |
| 7,739,466 B2 | 6/2010 | Rozas et al. | |
| 2005/0108296 A1* | 5/2005 | Nakamura | G06F 16/1724 |
| 2013/0111158 A1* | 5/2013 | Suzuki | G06F 12/0808 |
| | | | 711/156 |
| 2016/0124660 A1* | 5/2016 | Brown | G06F 11/1456 |
| | | | 711/154 |
| 2017/0249260 A1 | 8/2017 | Sahita et al. | |

* cited by examiner

*Primary Examiner* — Nicholas J Simonetti
(74) *Attorney, Agent, or Firm* — Cantor Colburn LLP; Steven Chiu

(57) ABSTRACT

Memory management that includes allocating physical memory having an append-only permission associated therewith to requesting user space applications is described. If a page frame is append-only, then data written to the page frame cannot be overwritten. Rather, any new data written to an append-only page frame must be written beginning at the next available write location within the page frame. An MMU determines whether a write request is requesting an append-only page frame, in which case, the MMU reserves the append-only page frame for the write request and consults a corresponding entry in a page table append to determine whether an offset associated with the write request is larger than a stored value in the entry that indicates the next available write location in the page frame. If so, the write request is executed and the data is written to the page frame beginning at the next available write location.

17 Claims, 4 Drawing Sheets

PAGE FRAME SECURITY

BACKGROUND

The present invention relates generally to page frames, and more particularly, to enhancements to page frame security.

A memory management unit (MMU) is a hardware unit that handles memory access requests and caching operations on behalf of a processor. The memory management unit converts a virtual memory address to a physical memory address. In particular, for each user space application, the MMU maintains a mapping (e.g., a page table) that maps each virtual memory address to a corresponding physical memory address. When a user space application attempts to access a page that is not currently in main memory (e.g., random access memory (RAM)), the MMU determines that a page fault has occurred and transfers control to a kernel of an operating system. The kernel then locates the data on disk, obtains an empty page frame in the RAM to use as a container for the data, loads the requested data into the empty page frame, updates the page table in the MMU to reference the new page frame, and returns control to the requesting user space application.

When all page frames are currently in use, the kernel must select a page frame for reuse for the page currently being requested by the user space application. If the evicted page frame was dynamically allocated by an application to hold data, or if an application modified the data after it was read into RAM, the data in the page frame must be written out to disk before the page frame is freed. If an application later references the evicted page, another page fault occurs and the page must be read back into RAM. Various page replacement algorithms are known for selecting the page frame to free up.

A page table is a data structure used by a virtual memory system in a computer operating system to store the mapping between virtual memory addresses and physical memory addresses. In addition to this mapping, various auxiliary information about a page frame may be stored including data indicating which permissions may be associated with a page frame such as a read permission, a write permission, or the like.

SUMMARY

In one or more example embodiments, a method for memory management is disclosed. The method includes receiving, at a memory management unit (MMU), a write instruction and determining, by the MMU, that an append flag associated with the write instruction is set. The method further includes reserving, by the MMU, a particular block of a physical memory for the write instruction. The method additionally includes determining, by the MMU, that an offset of the write instruction is larger than a value indicative of a next available write location in the particular block of the physical memory and executing the write instruction at least in part by writing data to the particular block of the physical memory beginning at a write location corresponding to the offset of the write instruction.

In one or more other example embodiments, a system for memory management is disclosed. The system includes physical memory storing computer-executable instructions, at least one processor, and a memory management unit (MMU) configured to handle memory access requests on behalf of the at least one processor. In one or more example embodiments, the MMU is configured to access the physical memory and execute the computer-executable instructions to perform a set of operations. The operations include receiving write instruction and determining that an append flag associated with the write instruction is set. The operations further include reserving a particular block of a physical memory for the write instruction. The operations additionally include determining that an offset of the write instruction is larger than a value indicative of a next available write location in the particular block of the physical memory and executing the write instruction at least in part by writing data to the particular block of the physical memory beginning at a write location corresponding to the offset of the write instruction.

In one or more other example embodiments, a computer program product for memory management is disclosed. The computer program product includes a non-transitory storage medium readable by a processing circuit, the storage medium storing instructions executable by the processing circuit to cause a method to be performed. The method includes receiving, at a memory management unit (MMU), a write instruction and determining, by the MMU, that an append flag associated with the write instruction is set. The method further includes reserving, by the MMU, a particular block of a physical memory for the write instruction. The method additionally includes determining, by the MMU, that an offset of the write instruction is larger than a value indicative of a next available write location in the particular block of the physical memory and executing the write instruction at least in part by writing data to the particular block of the physical memory beginning at a write location corresponding to the offset of the write instruction.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
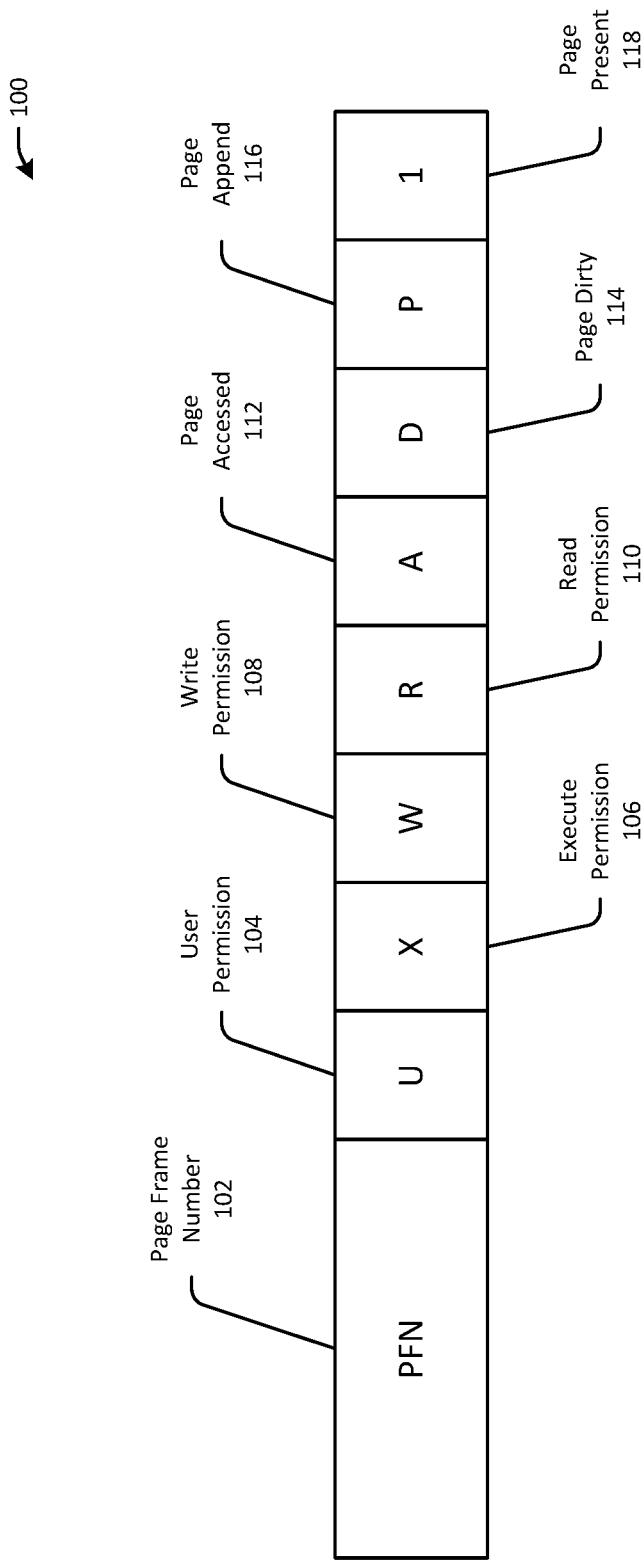
FIG. 1 is a schematic block diagram of an illustrative page table entry in accordance with one or more example embodiments.

Example embodiments relate to, among other things, systems, methods, computer-readable media, techniques, and methodologies for memory management that includes allocating physical memory having an append-only permission to requesting user space applications. In example embodiments, a page frame may be associated with a page frame memory protection field that indicates whether the page frame is an append-only page frame. More specifically, in example embodiments, a page table entry corresponding to any given page frame may include the page frame memory protection field, which can either be set (e.g., a binary 1) to indicate that the corresponding page frame is an append-only page frame or not set (e.g., a binary 0) indicating that the page frame is not append-only. If the page frame memory protection field is set to indicate that a corresponding page frame is an append-only page frame, then data written to the page frame cannot be overwritten. Rather, any new data written to an append-only page frame must be written beginning at the next available write location within the page frame. On the other hand, if the page frame memory protection field is not set, existing data written to the page frame can be overwritten with new data. By providing page frames having an append-only capability, example embodiments provide improved data security over conventional memory allocation by preventing existing data stored in such page frames from being overwritten while still allowing new data to be appended to the existing data.

In example embodiments, a memory management unit (MMU) may be provided that stores or is otherwise configured to access a page table append (PTA). The PTA may be a table that contains multiple entries, each of which contains a respective reference to a corresponding append-only page frame. Each PTA entry may include a respective value representative of a current value of a counter that can range from 0 to a page size of the corresponding page frame. While a typical page size is 4 kilobytes (KB), it should be appreciated that example embodiments are applicable to any page size. The counter value in a PTA entry may be representative of the last location that has been written to in the page frame. In example embodiments, a write request may only be executed with respect to an append-only page frame, if the offset specified in the write request is greater than the value of the PTA entry corresponding to that page frame.

More specifically, in example embodiments, when a write request is received, the MMU may determine whether an append flag associated with the write request has been set. The append flag may be set in connection with a memory allocator mechanism (mem_map), which may be a page frame descriptor array—an array of struct page descriptors that an operating system kernel uses to track the current status of page frames. In example embodiments, if the append flag is set, this indicates that the write request is seeking to write data to an append-only page frame. In example embodiments, if the MMU determines that the append flag is not set, the MMU may proceed with normal memory allocation by reserving and writing the data to a non-append-only (e.g., a non-protected) page frame. On the other hand, if the MMU determines that the append flag is set, the MMU may proceed to reserve a block of physical memory (e.g., an append-only page frame) for the protected write operation. While example embodiments may be described herein in connection with writing data associated with a given write request to a single page frame, it should be appreciated that data may be written to multiple page frames in connection with a single write request. Thus, in example scenarios in which a protected write is required, multiple page frames may be allocated for the protected write. In addition, the terms write request and write instruction may be used interchangeably herein.

After reserving a block of physical memory (e.g. one or more page frames) for the protected write, the MMU may consult the PTA entry corresponding to a reserved page frame to determine whether the write request can be executed. More specifically, in example embodiments, the MMU may determine whether an offset of the write request is greater than a value stored in the PTA entry that is indicative of the last location written to in the corresponding page frame. If this condition is satisfied, the MMU may proceed to execute the write request and write the new data associated with the write request to the page frame beginning at a next available write location in the page frame. The MMU may also update the stored value in the PTA entry to indicate the new last location written to in the page frame after the new data is written. If, on the other hand, the offset associated with the write request is not larger than the PTA entry value, the MMU may refrain from executing the write request and issue a page fault.

In example embodiments, the value stored in a PTA entry may be the last location that has been written to in a corresponding append-only page frame, in which case, a write request is only executed with respect to the append-only page frame if an offset associated with the write request is larger than the PTA stored value. In other example embodiments, however, the PTA stored value may represent the next available location in an append-only page frame that is available to be written to, in which case, a write request is executed with respect to the append-only page frame as long as the offset of the write request is greater than or equal to the stored PTA value. Thus, a stored PTA value may be indicative of a next available write location in an append-only page frame regardless of whether the stored PTA value points to the last location written to in the append-only page frame or the next available write location in the append-only page frame.

Example embodiments provide various technical features, technical effects, and/or improvements to computer technology. Example embodiments provide the technical effect of improved data security by providing the capability to perform protected write operations according to which data can be written to an append-only page frame and cannot be overwritten by subsequent write operations. This technical effect constitutes a technical improvement to computer technology that improves data security by storing data in append-only page frames where it cannot be overwritten, thereby making the data less vulnerable to tampering.

The technical effect of improved data security is achieved, at least in part, by the technical feature of providing page table entries that include a page frame memory protection field that can be set to identify a corresponding page frame as being an append-only page frame. The technical effect of improved data security is further achieved, at least in part, by the technical feature of providing an append flag at a software implementation level that indicates whether a write request is a protected write that requires an append-only page frame. The technical effect of improved data security is yet further achieved, at least in part, by providing a new data structure (a PTA) that includes entries corresponding to append-only page frames, where each entry stores a value indicative of a next available write location in a corresponding append-only page frame. The technical effect of improved data security is still further achieved, at least in part, by providing an improved MMU that is configured to execute a memory allocation routine that consults the PTA to determine whether a protected write can be performed with respect to an append-only page frame. Each of these technical features constitutes a software-based and/or hardware-based improvement to computer technology relating to memory allocation and data security.

Example embodiments of the invention are applicable to a multitude of use case scenarios. For instance, in the case of kernel logs, a message printing the contents of the ring buffer can be made tamper-proof by sending an append-only instruction to log the message. As another non-limiting example, the capability to implement append-only protected write operations in accordance with example embodiments of the invention can be used to improve data security in connection with electronic voting stations, image versioning, or the like.

An illustrative method in accordance with example embodiments of the invention and corresponding data structures (e.g., program modules) for performing the method will now be described. It should be noted that each operation of the method 300 may be performed by one or more of the program modules or the like depicted in FIG. 4, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 2:
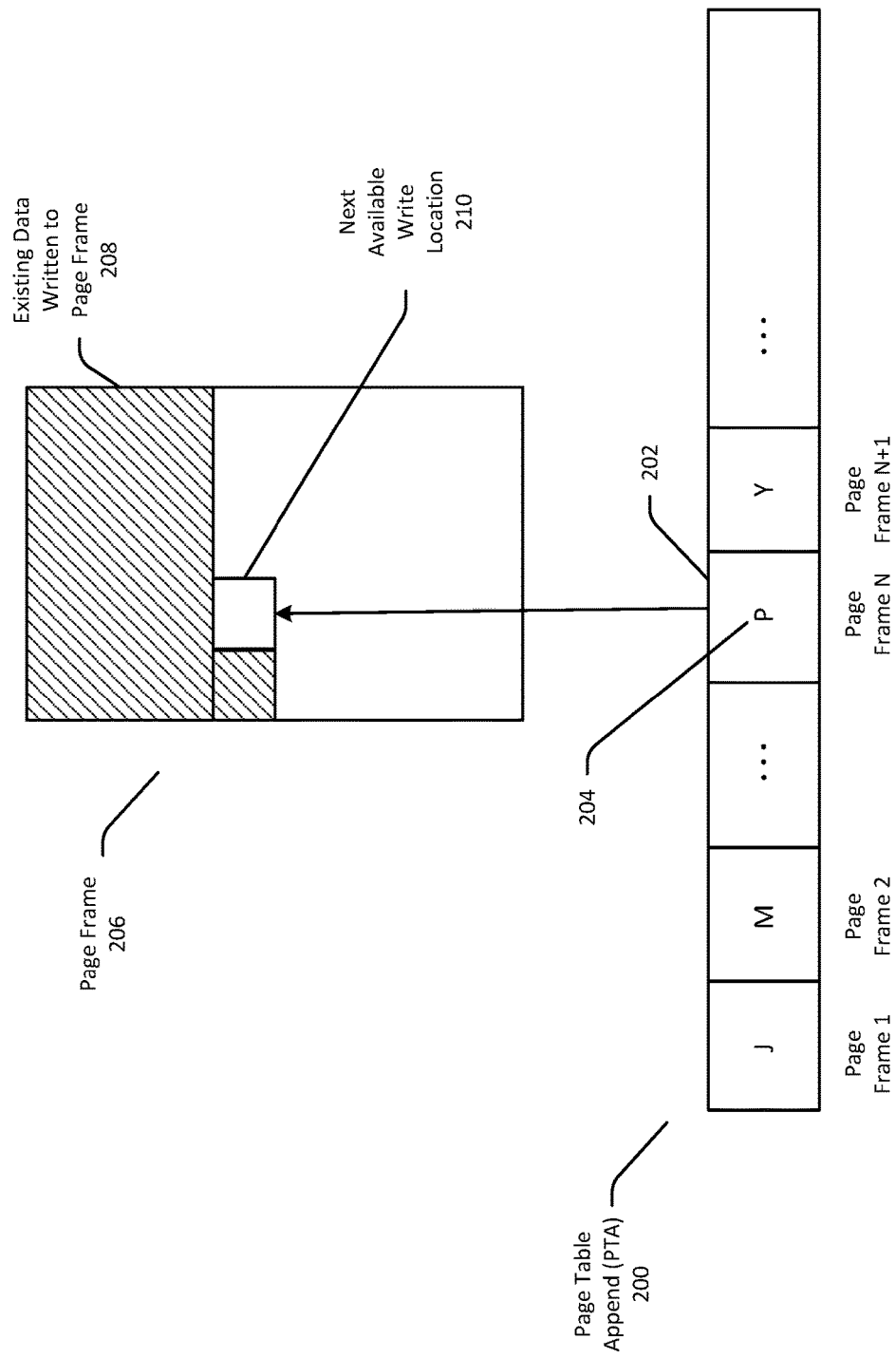
FIG. 2 is a schematic diagram of an illustrative implementation of the append-only permission for page frames using a page table append in accordance with one or more example embodiments.
Figure 3:
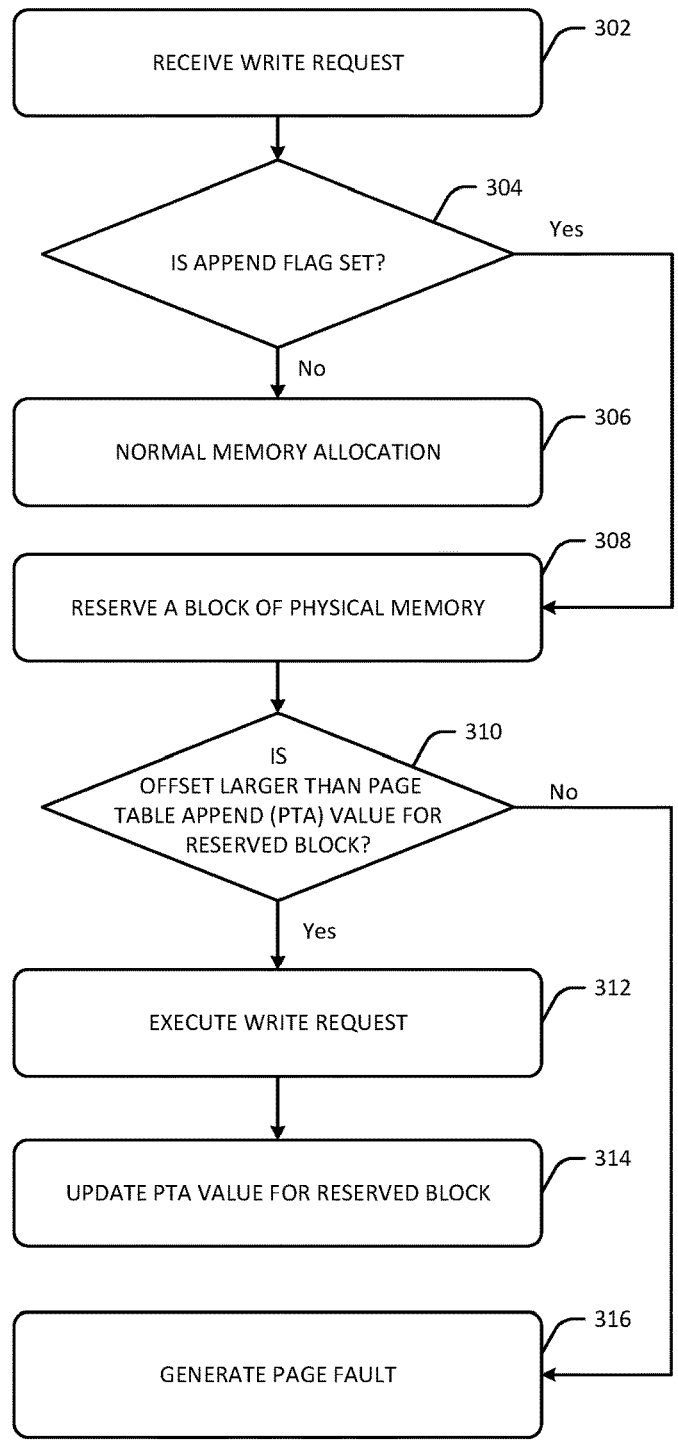
FIG. 3 is a process flow diagram of an illustrative method for allocating memory from a page frame with an append-only permission in accordance with one or more example embodiments.

FIG. 1 is a schematic block diagram of an illustrative page table entry in accordance with one or more example embodiments. FIG. 2 is a schematic diagram of an illustrative implementation of the append-only permission for page frames using a page table append in accordance with one or more example embodiments. FIG. 3 is a process flow diagram of an illustrative method 300 for allocating memory from a page frame with an append-only permission in accordance with one or more example embodiments. In example embodiments, the method 300 may be an example implementation of a memory allocation routine 420 depicted in FIG. 4. Each of FIGS. 1 and 2 will be described in conjunction with FIG. 3 hereinafter.

Referring first to FIG. 3, at block 302 of the method 300, an MMU in accordance with example embodiments (e.g., FIG. 4, MMU 406) receives a write request. The write request may specify whether the write is a protected write by setting an append flag in connection with a memory allocation mechanism (e.g., a system call mem_map). When a mem_map call is made for a file, an operating system kernel generates a corresponding entry in the MMU. Because the MMU monitors all reads and writes of the CPU to RAM, the MMU knows which mem_map entry is returned when a portion of the RAM is accessed. Reading portions of a file that are not yet stored in RAM results in page faults. The MMU catches such page faults and calls a kernel routine to load the correct portions of the file somewhere in RAM. The MMU then updates the mem_map entry so that it appears that the data is now located at the address provided by mem_map.

Figure 4:
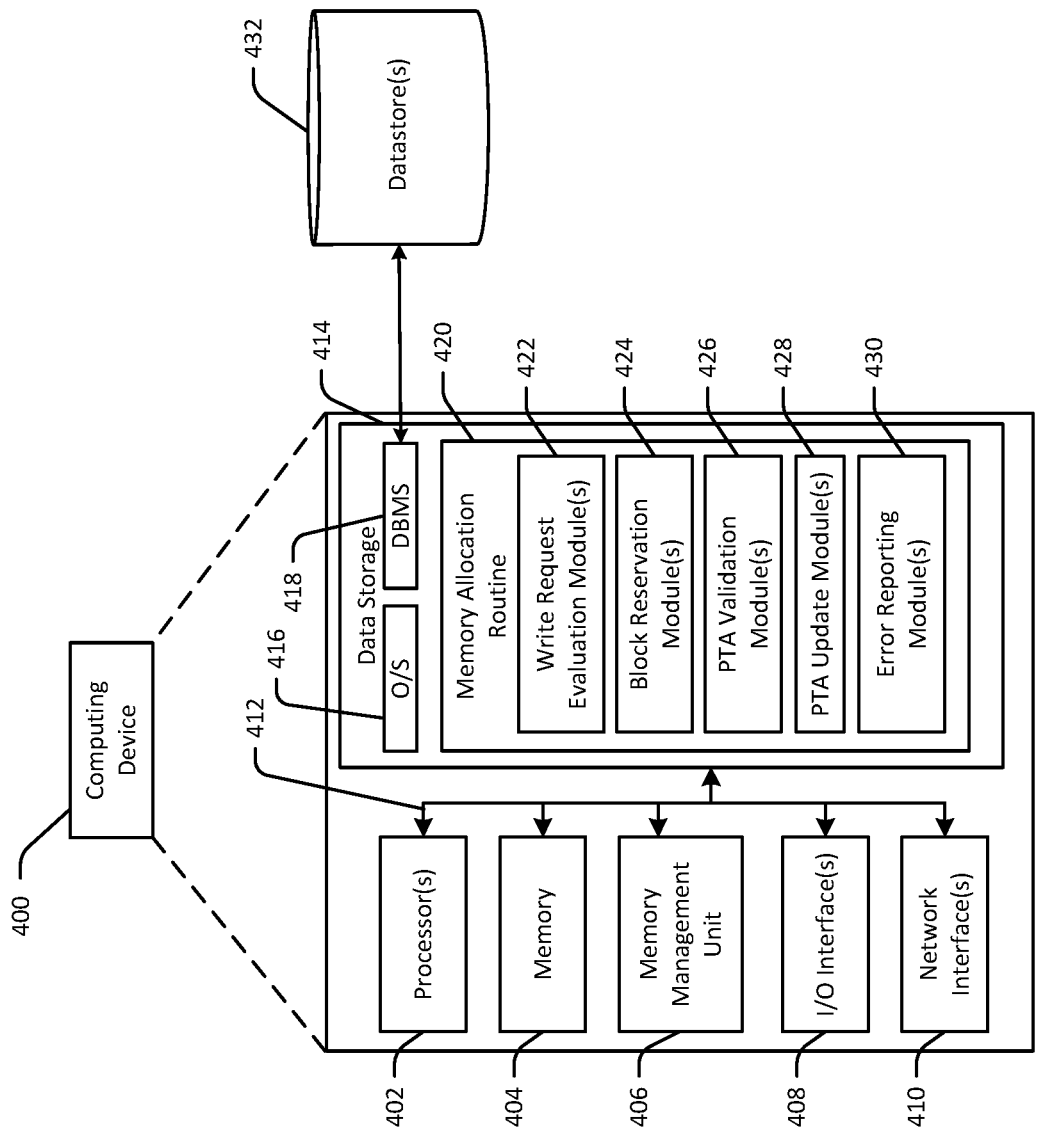
FIG. 4 is a schematic diagram of an illustrative computing device configured to implement one or more example embodiments.

At block 304 of the method 300, in example embodiments, the MMU executes executable instructions of one or more write request evaluation modules (e.g., FIG. 4, module(s) 422) to determine whether the append flag has been set in connection with the received write request. In response to a negative determination at block 304, the method 300 proceeds to block 306, where the MMU proceeds with normal memory allocation by allocating, for the write request, one or more page frames having the write permission set and writing data associated with the write request to the allocated page frame(s). On the other hand, in example embodiments, in response to a negative determination at block 304, the method 300 proceeds to block 308, where the MMU executes executable instructions of one or more block reservation modules (e.g., FIG. 4, module(s) 424) to reserve a block of physical memory for the received write request. The reserved block of physical memory may include one or more append-only page frames. However, for ease of explanation, it will be assumed that a single page frame is reserved at block 308.

In example embodiments, the MMU may determine that a page frame is an append-only page frame by consulting a corresponding page table entry. An example page table entry corresponding to an append-only page frame is depicted in FIG. 1. As shown in FIG. 1, the page table entry 100 may include various fields including a PFN field 102 that indicates a page frame number of the corresponding page frame as well as various fields that indicate permissions associated with the page frame. The permission fields may include a user permission field 104 that indicates whether the page frame can only be accessed by the kernel or by a user space application as well; an execute permission field 106 that indicates whether a user space application has permission to execute instructions stored in the page frame; a write permission field 108 that indicates whether a user space application has permission to write to the page frame; and a read permission field that indicates whether a user space application has permission to read data stored in the page frame. The page table entry 100 may further include a page accessed field 112 that indicates whether the page frame has been previously accessed; a page dirty field 114 that indicates whether data stored in the page frame has been modified and not yet written to disk; and a page present field 118 that indicates whether the page is still loaded into memory. In the example page table entry 100, the page present bit 118 is depicted as being set, indicating that the page is present in memory.

Further, in accordance with example embodiments, and as an improvement over conventional page table entries, the page table entry 100 includes a page frame memory protection field (page append field 116) that indicates whether the page frame is an append-only page frame, or in other words, whether existing data in the page frame cannot be overwritten and any new data must be appended to the existing data stored in the page frame. If the page append field 116 is set (e.g., a binary 1), this indicates that the page frame is an append-only page frame.

Referring again to FIG. 3, after reserving the append-only page frame at block 308, in example embodiments, the MMU executes executable instructions of one or more PTA validation modules (e.g., FIG. 4, module(s) 426) at block 310 of the method 300 to determine whether an offset associated with the received write request is larger than the PTA value corresponding to the reserved page frame. More specifically, the MMU may consult a PTA 200 schematically depicted in FIG. 2 to locate a PTA entry corresponding to the reserved page frame. The PTA 200 may contain multiple entries, each of which corresponds to a respective append-only page frame. Each PTA entry may store a respective counter value that indicates a next available write location in the corresponding page frame. Thus, at block 310, the MMU may locate a PTA entry 202 corresponding to a page frame 206 that has been reserved and determine whether an offset of the write request is larger than a value 204 stored in the PTA entry 202, where the value 204 is indicative of a next available write location 210 in the page frame 206. If the offset is larger than the value 204, the MMU may execute the write request and write data associated with the write request to the page frame 206 beginning at the next available write location 210. In this manner, existing data 208 written to the page frame 206 is protected and the new data written to the page frame 206 is appended to the existing data 208.

In example embodiments, the value 204 stored in the PTA entry 202 may represent the next available location 210 in the append-only page frame 206 that is available to be written to (as depicted in FIG. 2), in which case, the write request is executed with respect to the append-only page frame 206 as long as the offset of the write request is greater than or equal to the stored PTA value 204. However, in other example embodiments, the stored value 204 in the PTA entry 202 may represent the last location that has been written to in the append-only page frame 206, in which case, the write request is only executed with respect to the page frame 206 if the offset associated with the write request is strictly larger than the PTA stored value 204. Thus, the stored PTA value 204 may be indicative of the next available write location 210 in the page frame 206 regardless of whether the stored PTA value 204 points to the last location written to in the page frame 206 or the next available write location 210 in the append-only page frame 206.

Referring again to FIG. 3, in response to a positive determination at block 310, the MMU may execute the write request at block 312 of the method 300 and append data associated with the write request to existing data stored in the reserved page frame. Then, at block 314 of the method 300, in example embodiments, the MMU executes executable instructions of one or more PTA update modules (e.g., FIG. 4, module(s) 428) to update the stored PTA value in the PTA entry corresponding to the page frame to indicate the new last location written to in the page frame after the new data is written. For example, the MMU would update the value 204 (FIG. 2) to indicate a new next available write location 210 in the page frame 206 after the data associated with the write request has been written to the page frame 206.

On the other hand, in response to a negative determination at block 310, the MMU may execute executable instructions of one or more error reporting modules (e.g., FIG. 4, module(s) 430) at block 316 of the method 300 to report a page fault. That is, if the offset associated with the write request is not strictly larger than (or greater than or equal to) the PTA entry value, the MMU may refrain from executing the write request and instead may issue a page fault back to the requesting user space application.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

FIG. 4 is a schematic diagram of an illustrative computing device 400 configured to implement one or more example embodiments of the disclosure. The computing device 400 may be any suitable device including, without limitation, a server, a personal computer (PC), a tablet, a smartphone, a wearable device, a voice-enabled device, or the like. While any particular component of the computing device 400 may be described herein in the singular, it should be appreciated that multiple instances of any such component may be provided, and functionality described in connection with a particular component may be distributed across multiple ones of such a component.

Although not depicted in FIG. 4, the computing device 400 may be configured to communicate with one or more other devices, systems, datastores, or the like via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 400 may include one or more processors (processor(s)) 402; one or more memory devices 404 (generically referred to herein as memory 404); a memory management unit (MMU) 406; one or more input/output ("I/O") interface(s) 408; one or more network interfaces 410; and data storage 414. The computing device 400 may further include one or more buses 412 that functionally couple various components of the computing device 400.

The bus(es) 412 may include at least one of a system bus, a memory bus, an address bus, or a message bus, and may permit the exchange of information (e.g., data (including computer-executable code), signaling, etc.) between various components of the computing device 400. The bus(es) 412 may include, without limitation, a memory bus or a memory controller, a peripheral bus, an accelerated graphics port, and so forth. The bus(es) 412 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 404 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 404 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 404 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 414 may include removable storage and/or non-removable storage including, but not limited to, magnetic storage, optical disk storage, and/or tape storage. The data storage 414 may provide non-volatile storage of computer-executable instructions and other data. The memory 404 and the data storage 414, removable and/or non-removable, are examples of computer-readable storage media (CRSM) as that term is used herein.

The data storage 414 may store computer-executable code, instructions, or the like that may be loadable into the memory 404 and executable by the processor(s) 402 to cause the processor(s) 402 to perform or initiate various operations. The data storage 414 may additionally store data that may be copied to memory 404 for use by the processor(s) 402 during the execution of the computer-executable instructions. Moreover, output data generated as a result of execution of the computer-executable instructions by the processor(s) 402 may be stored initially in memory 404 and may ultimately be copied to data storage 414 for non-volatile storage.

More specifically, the data storage 414 may store one or more operating systems (O/S) 416; one or more database management systems (DBMS) 418 configured to access the memory 404 and/or one or more external datastores 432; and one or more program modules, applications, engines, managers, computer-executable code, scripts, or the like such as, for example, a memory allocation routine 420 that may include one or more write request evaluation modules 422; one or more block reservation modules 424; one or more page table append (PTA) validation modules 426; one or more PTA update module(s) 428; and one or more error reporting modules 430. Any of the components depicted as being stored in data storage 414 may include any combination of software, firmware, and/or hardware. The software and/or firmware may include computer-executable instructions (e.g., computer-executable program code) that may be loaded into the memory 404 for execution by one or more of the processor(s) 402 and/or the MMU 406 to perform any of the operations described earlier in connection with such modules.

Although not depicted in FIG. 4, the data storage 414 may further store various types of data utilized by components of the computing device 400 (e.g., data stored in the datastore(s) 432). Any data stored in the data storage 414 may be loaded into the memory 404 for use by the processor(s) 402 and/or the MMU 406 in executing computer-executable instructions. In addition, any data stored in the data storage 414 may potentially be stored in the external datastore(s) 432 and may be accessed via the DBMS 418 and loaded in the memory 404 for use by the processor(s) 402 and/or the MMU 406 in executing computer-executable instructions.

The processor(s) 402 may be configured to access the memory 404 and execute computer-executable instructions loaded therein. For example, the processor(s) 402 may be configured to execute computer-executable instructions of the various program modules, applications, engines, managers, or the like of the computing device 400 to cause or facilitate various operations to be performed in accordance with one or more example embodiments of the disclosure. The processor(s) 402 may include any suitable processing unit capable of accepting data as input, processing the input data in accordance with stored computer-executable instructions, and generating output data. The processor(s) 402 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 402 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 402 may be capable of supporting any of a variety of instruction sets.

The MMU 406 may also be configured to access the memory 404 and execute computer-executable instructions loaded therein. For example, the MMU 406 may be configured to execute computer-executable instructions of the various program modules, applications, engines, managers, or the like of the computing device 400 to cause or facilitate various operations to be performed in accordance with one or more example embodiments of the disclosure. In particular, the MMU 406 may be configured to execute the memory allocation routine 420 to allocate physical blocks of the memory 404 to requesting user space applications.

Referring now to other illustrative components depicted as being stored in the data storage 414, the O/S 416 may be loaded from the data storage 414 into the memory 404 and may provide an interface between other application software executing on the computing device 400 and hardware resources of the computing device 400. More specifically, the O/S 416 may include a set of computer-executable instructions for managing hardware resources of the computing device 400 and for providing common services to other application programs. In certain example embodiments, the O/S 416 may include or otherwise control the execution of one or more of the program modules, engines, managers, or the like depicted as being stored in the data storage 414. The O/S 416 may include any operating system now known or which may be developed in the future including, but not limited to, any server operating system, any mainframe operating system, or any other proprietary or non-proprietary operating system.

The DBMS 418 may be loaded into the memory 404 and may support functionality for accessing, retrieving, storing, and/or manipulating data stored in the memory 404, data stored in the data storage 414, and/or data stored in external datastore(s) 432. The DBMS 418 may use any of a variety of database models (e.g., relational model, object model, etc.) and may support any of a variety of query languages. The DBMS 418 may access data represented in one or more data schemas and stored in any suitable data repository. Data stored in the datastore(s) 432 may include, for example, page table entries, PTA entries, and so forth. External datastore(s) 432 that may be accessible by the computing device 400 via the DBMS 418 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 400, the input/output (I/O) interface(s) 408 may facilitate the receipt of input information by the computing device 400 from one or more I/O devices as well as the output of information from the computing device 400 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 400 or may be separate. The I/O devices may further include, for example, any number of peripheral devices such as data storage devices, printing devices, and so forth.

The I/O interface(s) 408 may also include an interface for an external peripheral device connection such as universal serial bus (USB), FireWire, Thunderbolt, Ethernet port or other connection protocol that may connect to one or more networks. The I/O interface(s) 408 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 400 may further include one or more network interfaces 410 via which the computing device 400 may communicate with any of a variety of other systems, platforms, networks, devices, and so forth. The network interface(s) 410 may enable communication, for example, with one or more other devices via one or more of networks.

It should be appreciated that the program modules/engines depicted in FIG. 4 as being stored in the data storage 414 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 400 and/or other computing devices accessible via one or more networks, may be provided to support functionality provided by the modules depicted in FIG. 4 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the computing device 400 may include alternate and/or additional hardware, software, or firmware components beyond those described or depicted without departing from the scope of the disclosure. More particularly, it should be appreciated that software, firmware, or hardware components depicted as forming part of the computing device 400 are merely illustrative and that some components may not be present or additional components may be provided in various embodiments. While various illustrative modules have been depicted and described as software modules stored in data storage 414, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations the method 300 may be performed by a computing device 400 having the illustrative configuration depicted in FIG. 4, or more specifically, by one or more program modules, engines, applications, or the like executable on such a device. It should be appreciated, however, that such operations may be implemented in connection with numerous other device configurations.

The operations described and depicted in the illustrative method of FIG. 3 may be carried out or performed in any suitable order as desired in various exemplary embodiments of the disclosure. Additionally, in certain example embodiments, at least a portion of the operations may be carried out in parallel. Furthermore, in certain example embodiments, less, more, or different operations than those depicted in FIG. 3 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for memory management, the method comprising:
receiving, at a memory management unit (MMU), a write instruction;
determining, by the MMU, that an append flag associated with the write instruction is set;
reserving, by the MMU, a particular block of a physical memory for the write instruction;
determining, by the MMU, that an offset of the write instruction is larger than a value indicative of a next available write location in the particular block of the physical memory; and
executing the write instruction at least in part by writing data to the particular block of the physical memory beginning at a write location corresponding to the offset of the write instruction,
wherein the particular block of the physical memory comprises a memory protection field that is set to indicate that existing data stored in the particular block of the physical memory cannot be modified and only new data can be appended to the existing data.

2. The computer-implemented method of claim 1, wherein determining that the offset is larger than the value indicative of the next available write location comprises:
accessing, by the MMU, an append-only table containing a plurality of entries, wherein each entry in the append-only table corresponds to a respective block of the physical memory;
identifying, by the MMU, a particular entry of the plurality of entries that corresponds to the particular block of the physical memory, wherein the particular entry comprises the value indicative of the next available write location in the particular block of the physical memory.

3. The computer-implemented method of claim 2, wherein the value indicative of the next available write location is a pointer to a last location written to in the particular block of the physical memory or a pointer to a next available write location in the particular block of the physical memory.

4. The computer-implemented method of claim 1, wherein the write instruction is a first write instruction and the particular block of the physical memory is a first block of the physical memory, the method further comprising:
receiving, at the MMU, a second write instruction;
determining, by the MMU, that an append flag associated with the second write instruction is not set;
executing the second write instruction at least in part by overwriting existing data stored in a second block of the physical memory with new data.

5. The computer-implemented method of claim 1, wherein the write instruction is a first write instruction, the method further comprising:
increasing the value indicative of the next available write location in the particular block of the physical memory based at least in part writing the data to the particular block of the physical memory;
receiving, at the MMU, a second write instruction;
determining, by the MMU, that an append flag associated with the second write instruction is set;
reserving, by the MMU, the particular block of the physical memory for the second write instruction;
determining, by the MMU, that an offset of the second write instruction is not larger than the updated value indicative of the next available write location in the particular block of the physical memory; and
generating, by the MMU, a page fault for the second write instruction.

6. The computer-implemented method of claim 1, wherein the particular block of the physical memory is a page frame, and wherein the value indicative of the next available write location is within a range of values from zero to a page size of the page frame.

7. A system for memory management, the system comprising:
physical memory storing computer-executable instructions;
at least one processor; and
a memory management unit (MMU) configured to handle memory access requests on behalf of the at least one processor, wherein the MMU is configured to access the physical memory and execute the computer-executable instructions to:
receive a write instruction;
determine that an append flag associated with the write instruction is set;
reserve a particular block of the physical memory for the write instruction;
determine that an offset of the write instruction is larger than a value indicative of a next available write location in the particular block of the physical memory; and
execute the write instruction at least in part by writing data to the particular block of the physical memory beginning at a write location corresponding to the offset of the write instruction,
wherein the particular block of the physical memory comprises a memory protection field that is set to indicate that existing data stored in the particular block of the physical memory cannot be modified and only new data can be appended to the existing data.

8. The system of claim 7, wherein the MMU is configured to determine that the offset is larger than the value indicative of the next available write location by executing the computer-executable instructions to:
access an append-only table containing a plurality of entries, wherein each entry in the append-only table corresponds to a respective block of the physical memory;
identify a particular entry of the plurality of entries that corresponds to the particular block of the physical memory, wherein the particular entry comprises the value indicative of the next available write location in the particular block of the physical memory.

9. The system of claim 8, wherein the value indicative of the next available write location is a pointer to a last location written to in the particular block of the physical memory or a pointer to a next available write location in the particular block of the physical memory.

10. The system of claim 7, wherein the write instruction is a first write instruction and the particular block of the physical memory is a first block of physical memory, and wherein the MMU is further configured to execute the computer-executable instructions to:
receive a second write instruction;
determine that an append flag associated with the second write instruction is not set;
execute the second write instruction at least in part by overwriting existing data stored in a second block of the physical memory with new data.

11. The system of claim 7, wherein the write instruction is a first write instruction, and wherein the MMU is further configured to execute the computer-executable instructions to:
- increase the value indicative of the next available write location in the particular block of the physical memory based at least in part writing the data to the particular block of the physical memory;
- receive a second write instruction;
- determine that an append flag associated with the second write instruction is set;
- reserve the particular block of the physical memory for the second write instruction;
- determine that an offset of the second write instruction is not larger than the updated value indicative of the next available write location in the particular block of the physical memory; and
- generate a page fault for the second write instruction.

12. The system of claim 7, wherein the particular block of the physical memory is a page frame, and wherein the value indicative of the next available write location is within a range of values from zero to a page size of the page frame.

13. A computer program product for memory management, the computer program product comprising a storage medium readable by a processing circuit, the storage medium storing instructions executable by the processing circuit to cause a method to be performed, the method comprising:
- receiving, at a memory management unit (MMU), a write instruction;
- determining, by the MMU, that an append flag associated with the write instruction is set;
- reserving, by the MMU, a particular block of the physical memory for the write instruction;
- determining, by the MMU, that an offset of the write instruction is larger than a value indicative of a next available write location in the particular block of the physical memory; and
- executing the write instruction at least in part by writing data to the particular block of the physical memory beginning at a write location corresponding to the offset of the write instruction,
- wherein the particular block of the physical memory comprises a memory protection field that is set to indicate that existing data stored in the particular block of the physical memory cannot be modified and only new data can be appended to the existing data.

14. The computer program product of claim 13, wherein determining that the offset is larger than the value indicative of the next available write location comprises:
- accessing, by the MMU, an append-only table containing a plurality of entries, wherein each entry in the append-only table corresponds to a respective block of physical memory;
- identifying, by the MMU, a particular entry of the plurality of entries that corresponds to the particular block of the physical memory, wherein the particular entry comprises the value indicative of the next available write location in the particular block of the physical memory.

15. The computer program product of claim 14, wherein the value indicative of the next available write location is a pointer to a last location written to in the particular block of the physical memory or a pointer to a next available write location in the particular block of the physical memory.

16. The computer program product of claim 13, wherein the write instruction is a first write instruction and the particular block of the physical memory is a first block of physical memory, the method further comprising:
- receiving, at the MMU, a second write instruction;
- determining, by the MMU, that an append flag associated with the second write instruction is not set;
- executing the second write instruction at least in part by overwriting existing data stored in a second block of the physical memory with new data.

17. The computer program product of claim 13, wherein the write instruction is a first write instruction, the method further comprising:
- increasing the value indicative of the next available write location in the particular block of the physical memory based at least in part writing the data to the particular block of the physical memory;
- receiving, at the MMU, a second write instruction;
- determining, by the MMU, that an append flag associated with the second write instruction is set;
- reserving, by the MMU, the particular block of the physical memory for the second write instruction;
- determining, by the MMU, that an offset of the second write instruction is not larger than the updated value indicative of the next available write location in the particular block of the physical memory; and
- generating, by the MMU, a page fault for the second write instruction.

* * * * *